Jan. 6, 1942.    K. P. KROGH ET AL    2,269,273
APPARATUS FOR PREDRYING OF WASTE FUEL IN FURNACES
Filed Jan. 19, 1938
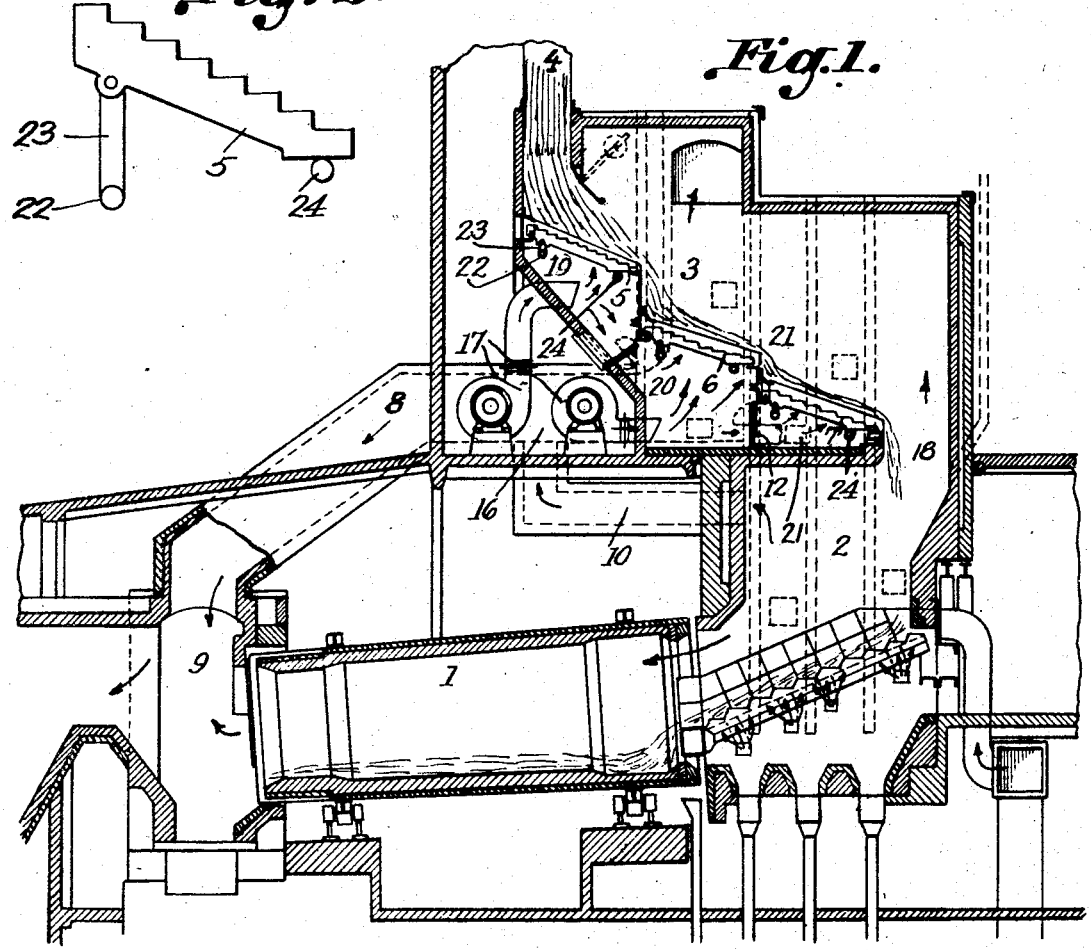
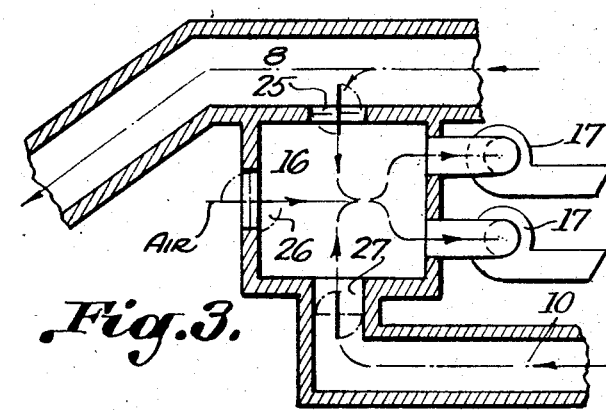
INVENTORS:
KRISTIAN POULSEN KROGH
CHRISTIAN HENRIK BIERING
BY: Francis E. Dayce
ATTORNEY Patented Jan. 6, 1942

2,269,273

UNITED STATES PATENT OFFICE 2,269,273

APPARATUS FOR PREDRYING OF WASTE FUEL IN FURNACES

Kristian Poulsen Krogh, Charlottenlund, near Copenhagen, and Christian Henrik Biering, Copenhagen, Denmark Application January 19, 1938, Serial No. 185,648
In Denmark January 20, 1937

7 Claims. (Cl. 110—8)

When working with waste fuel domestic and town's refuse and the like, which may contain up to 60–65% of water, besides much ash, and may have an effective heating value of only 700–800 kilogram calories, it is important that the refuse should previously be dried.

The present invention relates to a plant in which the drying process is effected by blowing atmospheric air, combustion gases etc. through an apparatus which, if need be, may also serve for the burning of the fuel. Afterwards the combustion of the fuel is finished on special grates or in other furnaces.

The moisture content of the refuse may vary much within a limited space of time and, in case the moisture content should suddenly fall, the consequence may be that the refuse bursts into flames. The part of the grate that ordinarily is used for the drying of the refuse should therefore be constructed in such a manner that it is capable of working partly as a fuel grate. In this way, a big grate area is obtained for the incineration if the refuse is rather dry, so that during such conditions the output may be increased considerably.

The apparatus is constructed as a movable horizontal grate or a step grate over which the fuel, in a manner known per se, is carried forward in a continuous stream, while air—also in a known way—is blown through the fuel bed in order to dry the same. The invention is characterized in that the drying grate is divided into two or more sections, each of which is placed in a lower position than the preceding one, with the result, that the fuel, when passing over the grate, falls from one section to the next one and thereby is turned about and mixed, so that the fuel will be dried, uniformly throughout the entire layer, the drying air being led from the chamber underneath the drying zone up to and through the fuel bed.

By placing the sections in such stepped positions, abrupt ledges are obtained so that the refuse, when passing over the grate, falls through a substantial distance from one section down, on to the next step or section. The refuse will thereby be whirled about and mixed in such a manner that a portion of the upper wet and heavy layers will be moved nethermost, while the lower lighter parts will tend to move uppermost. The drying effect is increased by the air blown through the grate and which action of the air also assists in sorting the fuel so that the dried, lighter parts of the fuel will come on the top of the wetter and heavier parts thereof.

The air to be used may be either cold or hot atmospheric air or air that has been used for the drying process, or combustion gases, or a mixture thereof, which is blown in under the grate, partly as a drying medium, partly if need be, as combustion air. The part of the apparatus, that is mainly used for drying the refuse is so constructed that the refuse may burst into flames thereon, without damaging the apparatus.

The chamber underneath the drying and burning grate should preferably be divided into several air compartments, transversely of the grate surface, so that the individual parts of the drying air can be supplied at different pressures or as air of different compositions. In the first section of the grate, i. e. the part on to which the fresh fuel is fed, air at a comparatively high pressure is employed, as the refuse, at this stage, is often wet and heavy and consequently offers a high resistance to the passage of the air. In the subsequent sections, a lower and lower pressure may be used.

One construction of the invention is illustrated by way of example in the accompanying drawing, in which Fig. 1 is a central vertical section through an apparatus constructed in accordance with the invention;

Fig. 2 is a side view on an enlarged scale of one of the grate sections illustrating the mechanism for rocking the same; and Fig. 3 is a sectional view through a mixing chamber forming part of the apparatus.

The plant consists mainly of three interconnected parts 1, 2 and 3. 1 indicates a rotating kiln and 2 a combustion chamber with an ignition grate of known construction. On a higher level, a special chamber 3 is disposed in which the apparatus according to the invention is disposed. The chamber contains a movable grate which in the drawing is shown to be divided into three sections 5, 6 and 7, which are offset stepwise relatively to each other and at a substantial distance one above the other. For feeding of refuse, a shaft 4 leads to the chamber 3. The refuse slides from the shaft on to the grate section 5 over which it passes. At the step between the sections 5 and 6, the refuse drops down on to the next section 6, over which it passes further on and down on to section 7 and, finally, through a shaft 18 on to the ignition grate in the chamber 2 and thence into the rotary kiln 1, in which the incineration is completed and the formation of clinkers is effected. In addition to the mixing of the fuel as above stated, by causing the refuse to fall from one section to another, the further advantage is attained that any funnels that might be formed in the fuel bed and which might allow a greater part of the air to pass useless therethrough will be closed again. The formation of such funnels will also be prevented by the motion of the grate sections themselves which possibly may be constructed as step grates.

As shown herein, the grate sections 5, 6 and 7 rest at their forward portions on rollers 24 and each section is pivotally connected to a crank 23 secured to an oscillating shaft 22, whereby short reciprocatory movements are imparted to the grate sections, thus exerting a pushing action on the fuel and causing it to move forward over the inclined surfaces of the grate sections. The oscillating shafts 22 may be operated independently of each other, enabling the fuel to move over the individual sections at different speeds and consequently in layers of different thicknesses, and thereby it becomes possible to control the drying, as well as the combustion, in an appropriate manner.

While passing over the grate sections 5 and 6 and 7, the fuel is dried and, as the case may be, bursts into flames. The drying is effected partly by the use of hot gases directed from the combustion chamber proper 2, by way of the shaft 18, to the chamber 3, where the gases sweep over the fuel lying on the sections 5, 6 and 7, so that the said gases dry the fuel and possibly ignite the same. The drying is assisted by blowing air through the bed of refuse resting on the step grate. As the refuse requires a varying air supply, depending on its degree of dryness, it is well to divide the space below the grate into separate compartments or air chambers 19, 20 and 21, each supplied with air of appropriate qualities. When the refuse leaves the shaft 4 and lands on to the grate section 5, it is as a rule very wet and difficult to ignite. As this fuel bed is comparatively compact and consequently presents considerable resistance to the passage of air therethrough, the air should be supplied at a relatively high pressure. The air at this point may consist mainly of combustion gases poor in oxygen, and may be taken either from the combustion chamber or from the air that already has been used for the drying process, by using the same once more. If the temperature of this air is appreciably higher than 100° C., a good heat economy will be attained by such a recirculation of the air. Later, when the refuse has travelled over a smaller or larger area of the grate, and has become more or less dried, combustion may take place here. It is therefore necessary, on this part of the grate, to supply air, possibly mixed with combustion gases, etc. For the supply of air at a suitable pressure, temperature and composition below the grate, one or more fans 17 are used, so that each of the compartments 19, 20 and 21, is supplied with air of suitable qualities. One fan may serve one or more compartments. If one fan serves more than one compartment, the compartments may be interconnected by means of openings with dampers 11 and 12, in such a manner that the pressure in the individual compartments can be adjusted. The fan is connected to the compartment that requires the highest pressure. The air from this compartment is then throttled through the damper on its way to the compartment requiring a lower pressure. As previously mentioned it is, as a rule, most convenient to have the pressure highest at the point where the fuel enters, and lowest near the shaft 18. The drawing shows how the compartments, 19, 20 and 21 respectively correspond to the grate sections 5, 6 and 7. This, however, is not indispensable, and the space underneath the grate may be divided in any other suitable manner without reference to the grate.

The air that has passed through the fuel bed, and has served to dry and, maybe, to cause combustion of the fuel, as well as the air that has been directed to the chamber 3 through the shaft 18, is removed therefrom by way of an opening leading to a channel 8 and further on, by way of a smoke flue 9, to the chimney. The air, however, may be led to the combustion chamber at some other point. It is preferable to take care that the air should be supplied at such a point that the temperature there will be sufficiently high to destroy or incinerate completely the gases that have been carried forward with the drying air from the refuse.

As previously mentioned, the air which passes through the refuse may, according to requirements, be a mixture of cold or hot atmospheric air, or of air that already has served once for the drying process, or of combustion gases. Before the air goes to the fans, it has been mixed in one or more mixing chambers 16. Fig. 3 illustrates a suitable arrangement of one of the mixing chambers. As shown in this figure, the chamber communicates by way of dampered ports 25, 26, and 27 respectively with the flue 8, the atmosphere and the duct 10. It may be advisable to provide a mixing chamber for each fan. If the air is too cold, it may be preheated by passing through a preheater. The combustion gases may be taken, through the duct 10, from a point in the combustion chamber 2 at which the combustion gases have a suitable temperature and composition. On the drawing, the mixing chamber 16 is thus shown connected with the chamber 2 by means of a duct 10. Further, air may be led to the mixing chambers from the channel 8. In this way, a greater part of the air can be caused to circulate more than once through the fuel bed. Thereby, a high percentage of water in the air that leaves the plant through the channel 8 can be attained and, consequently, as already mentioned, also good heat economy.

Having thus described our invention, what we claim is:

1. In a furnace for burning refuse, a refuse predrying apparatus for drying the refuse in a single layer and comprising a grate consisting of longitudinal grate bars disposed above the combustion chamber of the furnace and movable means for imparting reciprocatory longitudinal movement to said grate bars to move the refuse forward in a one way continuous stream along the grate, said grate being subdivided into a plurality of sections vertically offset in step-wise relation to and in continuation of each other in the direction of the movement of the fuel the said sections being at such height one above the other that the refuse during its passage over the grate will fall a substantial distance from one section to the next succeeding section thereby to cause the refuse to turn and be thoroughly mixed, and below the said grate for each of said sections a separate compartment being arranged for supplying a combustion gas and air mixture through the single layer of the refuse as it moves on said sections for drying said refuse.

2. Pre-drying apparatus as set forth in claim 1, the movable means for the individual grate sections being independently operable whereby the refuse may be moved at different speeds and in layers of different thicknesses on the individual sections.

3. In a furnace for burning waste fuel and refuse, a refuse pre-drying apparatus comprising a grate disposed above the combustion chamber of the furnace and including a plurality of sections vertically offset in stepwise relation to each other, movable means for imparting reciprocatory movement to said grate thereby to move the refuse forward in a continuous stream along the grate, means for directing a combustion gas directly from the combustion chamber through and over the refuse as it moves on said sections, a wall between said combustion chamber and said grate and forming a closed chamber below the grate, partitions dividing said chamber into separate air compartments, one for each section of the grate, means for supplying gas at different pressures and temperatures and of different composition to the individual compartments, each of said partitions having an opening therein whereby one compartment may be placed in communication with another, and adjustable dampers associated with said openings whereby gas may be directed from one compartment into another.

4. Pre-drying apparatus as set forth in claim 1, the movable means for the individual grate sections being independently operable whereby the refuse may be moved at different speeds and in layers of different thicknesses on the individual sections, said apparatus having partitions forming mixing chambers communicating partly with the space above the predrying grate and partly with the combustion chamber of the furnace, whereby drying gas of suitable temperature and composition may be accumulated in said mixing chambers, means for directing currents of gas from said mixing chambers through the bed of refuse on said grate.

5. A refuse pre-drying apparatus as set forth in claim 1, including a wall between the combustion chamber and said grate and forming a closed chamber below the grate, partitions dividing said chamber into separate gas compartments, one for each section of the grate, and means for supplying combustion gases directly from the combustion chamber to the individual compartments.

6. A refuse pre-drying apparatus as set forth in claim 1, including a wall between the combustion chamber and said grate and forming a closed chamber below the grate, partitions dividing said chamber into separate gas compartments, one for each section of the grate, and means for supplying a mixture of combustion gases directly from the combustion chamber and air at different pressures and temperatures to the individual compartments.

7. Apparatus as set forth in claim 1, and including means for mixing the combustion gases with the air and gases which have been used for drying the fuel and with atmospheric air thereby to control the drying of fuel on the grate.

KRISTIAN POULSEN KROGH.
CHRISTIAN HENRIK BIERING.